United States Patent [19]

Fuchs

[11] Patent Number: 5,301,841
[45] Date of Patent: Apr. 12, 1994

[54] MEDIA DISCHARGE APPARATUS FOR HOUSING A MOVABLE RESERVOIR

[75] Inventor: Karl-Heinz Fuchs, Radolfzell, Fed. Rep. of Germany

[73] Assignee: Ing. Erich Pfeiffer GmbH & Co. KG, Radolfzell, Fed. Rep. of Germany

[21] Appl. No.: 827,399

[22] Filed: Jan. 29, 1992

[30] Foreign Application Priority Data

Jan. 29, 1991 [DE] Fed. Rep. of Germany ....... 4102506

[51] Int. Cl.⁵ .................................................. B67D 5/60
[52] U.S. Cl. .................................. 222/135; 222/145; 222/160
[58] Field of Search ............. 222/94, 131, 135, 137, 222/145, 160, 162, 321, 385–387, 255, 257

[56] References Cited

U.S. PATENT DOCUMENTS

| | | | |
|---|---|---|---|
| 3,718,234 | 2/1973 | Bagguley | 222/135 |
| 3,741,443 | 6/1973 | Marand | 222/145 |
| 4,460,711 | 7/1984 | Jacobson | 521/65 |
| 4,674,658 | 6/1987 | Van Brocklin | 222/137 |
| 4,773,562 | 9/1988 | Gueret | 222/135 |
| 4,792,062 | 12/1988 | Goncalvis | 222/145 |
| 4,826,048 | 5/1989 | Skorka et al. | 222/137 |
| 4,969,579 | 11/1990 | Behar | 222/145 |
| 5,169,029 | 12/1992 | Behar et al. | 222/135 |

FOREIGN PATENT DOCUMENTS

| | | | |
|---|---|---|---|
| 429609 | 5/1991 | European Pat. Off. | |
| 2335601 | 1/1975 | Fed. Rep. of Germany | |
| 3614515 | 11/1987 | Fed. Rep. of Germany | |
| 2396702 | 3/1979 | France | 222/135 |

Primary Examiner—Andres Kashnikow
Assistant Examiner—Philippe Derakshani
Attorney, Agent, or Firm—Gary M. Nath

[57] ABSTRACT

A discharge apparatus for media comprises two functional units, each including a medium reservoir, a discharge unit operatively connected to the medium reservoir, and a depressible discharge actuator operatively connected to the discharge unit. A mechanism is further provided for simultaneously depressing the discharge actuators. At least one of the functional units is movable with its associated discharge actuator over part of the depression of the discharge actuator, so that the media are not discharged from the medium reservoirs during movement of the functional units.

33 Claims, 3 Drawing Sheets

MEDIA DISCHARGE APPARATUS FOR HOUSING A MOVABLE RESERVOIR

BACKGROUND OF THE INVENTION

1. Field of the Invention

The invention relates to a discharge apparatus with which at least one flowable medium can be manually discharged. The flowable medium can have a random aggregate state, but is preferably a pasty, liquid and/or pulverulent material. Such discharge apparatuses appropriately have at least one medium reservoir and at least one discharge unit, which can be formed by a manually driveable pump, an aerosol valve, etc. there is also a discharge actuator, which is mainly formed by a pushbutton and which is actuated over an actuation stroke, whereof at least part of the actuation stroke can simultaneously comprise a discharge stroke by means of which the medium is discharged from the discharge apparatus.

2. Description of the Prior Art

For numerous reasons in the case of discharge apparatuses of this type, there can be a need over part of the actuation stroke for discharge not to take place or only to take place at a delivery speed, which is much lower than the maximum delivery speed. If, e.g., two discharge units are simultaneously operated by means of a common discharge actuator, it can be appropriate to modify and/or start the discharge strokes of the two discharge units in a slaggered manner. If this is brought about by delaying the pressure buildup in the pressure chamber by using discharge pumps as the discharge units, a very complicated and not very reliable device results. An at least partial separation of the discharge stroke from the actuating strokes can also be advantageous for other reasons, for example to prevent unauthorized use of the device by allowing, an actuation, but not a discharge of the apparatus in a predetermined functional position.

The problem addressed by the invention is to provide a discharge apparatus of the aforementioned type, which avoids the disadvantages of known constructions. In particular, it must be possible in a simple manner to separate the discharge stroke from at least part of the actuating stroke, without any special requirements having to be made on the working characteristics of the discharge unit.

SUMMARY OF THE INVENTION

According to the invention this problem is solved by providing at least one medium reservoir, at least one discharge unit and/or a similar functional unit, substantially as an entity with the discharge actuator, which is movable in such a way over a retarding stroke, that the device is either not discharged or is only discharged with a reduced delivery per stroke unit.

If, e.g. in accordance with DE-OS 36 14 515, to which reference should be made for further details, advantages and effects, two separate discharge units are operated by means of a common handle, despite roughly the same delivery volumes, the effective delivery volume of one medium reservoir can be reduced at random compared with that of the other reservoir. There can also be time staggering of the start of the discharge from one medium reservoir compared with that of the other, or the delivery valves of the two discharge units can be adjusted in such a way that although the start of the discharge takes place roughly simultaneously, the medium in one discharge unit is much more strongly precompressed and therefore passes out at a higher pressure than from the other discharge unit. If the retarding stroke is to be engaged or disengaged, or its start and/or finish and therefore optionally its length are to be modified, then this construction can also be used to prevent unauthorized discharge or for modifying a dosed discharge quantity, the discharge apparatus possibly having only one medium reservoir and/or one discharge unit.

Instead of moving the discharge unit, e.g. a pump casing, with respect to the medium reservoir over the entire retarding or idle stroke or part thereof, the arrangement is preferably such that the medium reservoir is synchronously also movable with respect to a body with the discharge actuation, so that there is no relative movement between the discharge unit components to be moved for the discharge, but the basic body of the discharge unit can be rigidly connected with the medium reservoir.

In order to bring about the retarding stroke, the operating handle can be moved relative to an operating member of the discharge unit, e.g. an operating plunger, over an empty or idle stroke, but in order to obtain easy sealing effects, it is advantageous for the movable functional part to be connected to the operating handle independently or separately from the connection through the operating member via a driver or the like. Connection preferably takes place in such a way that the functional part, initially substantially without actuation, is synchronously moved along or in a decelerated manner, optionally accompanied by reduced actuation, so that the discharge unit is actuated synchronously over the remainder of the actuating stroke. The driver appropriately gives way elastically in that its effective length is reduced.

The inventive construction is also suitable for such support apparatuses or discharge units with which only a single, substantially complete emptying of the medium reservoir takes place and therefore no return stroke or travel is necessary. However, it is particularly suitable for discharge units which, substantially for each return stroke, suck from the medium reservoir a predetermined medium quantity into a pressure or pump chamber and then yield it again during the next actuating stroke. Such discharge units can be thrust piston pumps which, in the interior of a cylinder casing, receive in a completely encapsulated manner a return spring acting on the pump piston. This return spring is also suitable, following each actuating stroke, to so return the discharge apparatus to its discharge position such that no separate return spring is required. This return operation then includes the return of the movable functional unit by the retarding stroke. In place of a separate driver, appropriately the aforementioned driver is used, which in the manner of a snap connection engages behind a ring shoulder of the functional unit, said ring shoulder being formable by a ring flange at the end of a vessel neck of the medium reservoir. Thus, it is possible in a simple manner, to connect the functional part during installation via a plug or snap connection to the actuating handle.

If the discharge unit is not or not solely movable with respect to the medium reservoir and instead the latter is movable over at least part of the retarding stroke, a separate body is provided for its mounting and is appropriately constructed as a casing receiving one or all the medium reservoirs in a substantially completely encapsulated manner and with respect to which the actuating handle is displaceable by the actuating stroke. For the mounting of the movable functional part, said outer casing can have a substantially one-piece inner casing therewith, e.g., a bearing shaft projecting inwards in a contact-free manner from one end wall, whose bottom wall remote from the end wall forms the stop for the movable functional unit. An easy installation is obtained if the movable functional part or at least a closed subassembly formed by the medium reservoir and the discharge unit is inserted from the side of said end wall in the casing, whereas at least one corresponding, but non-movable subassembly is inserted from the other end of the casing and is preferably secured in the vicinity of the inside of said end wall by means of a snap connection. Following insertion, the other, initially open end of the casing can then be closed with a cover, cap, etc. Following the insertion of the subassemblies the cap-like actuating handle can be engaged by plug or snap connections and can be simultaneously connected with the actuating members of all the discharge units projecting over the end wall.

These and other features of the invention will be understood from the claims, description and drawings. The invention is described in greater detail hereinafter relative to a preferred embodiment illustrated in the attached drawings, wherein:

DETAILED DESCRIPTION OF THE INVENTION

Figure 1:
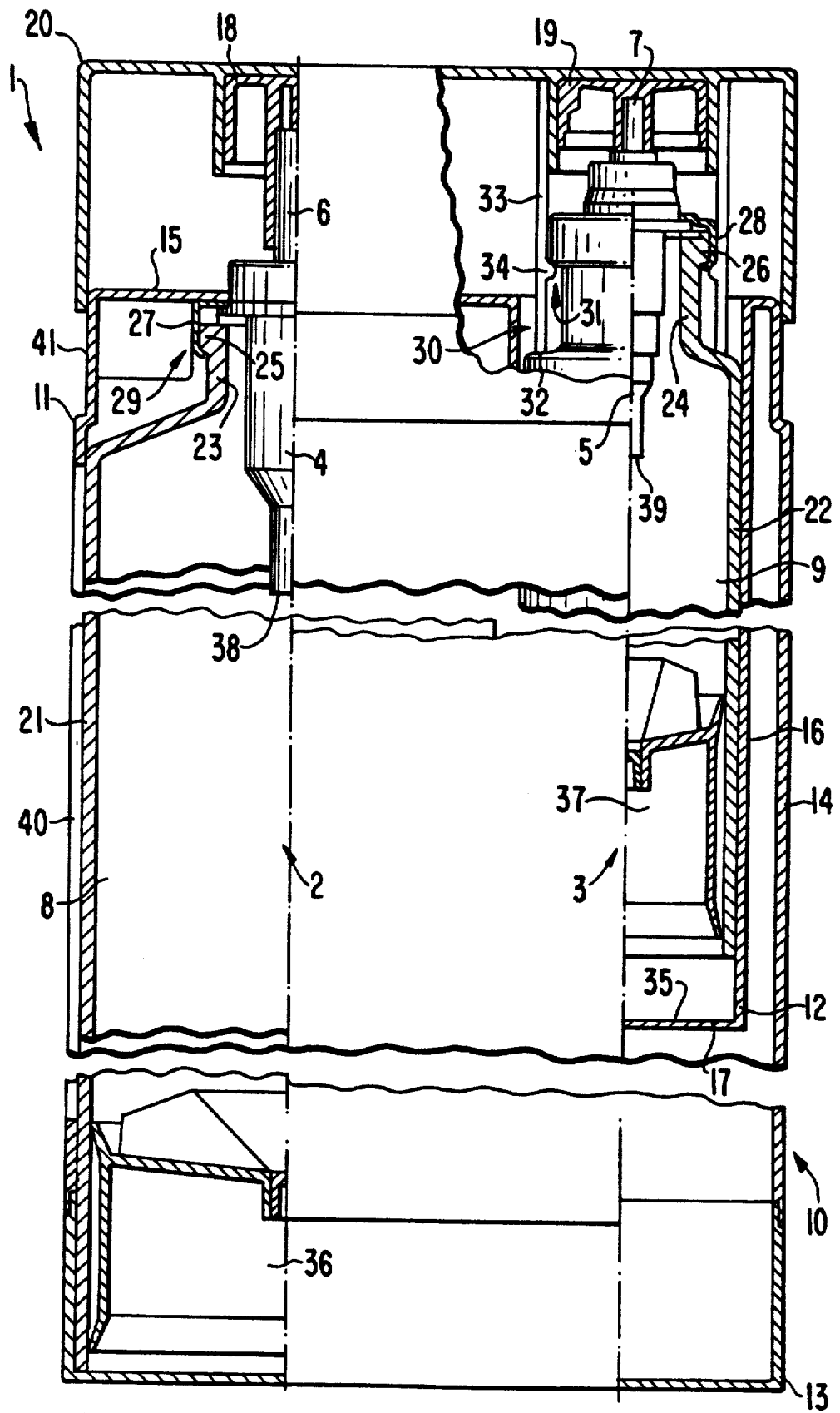
FIG. 1 shows the invention discharge apparatus in a part sectional view.
Figure 2:
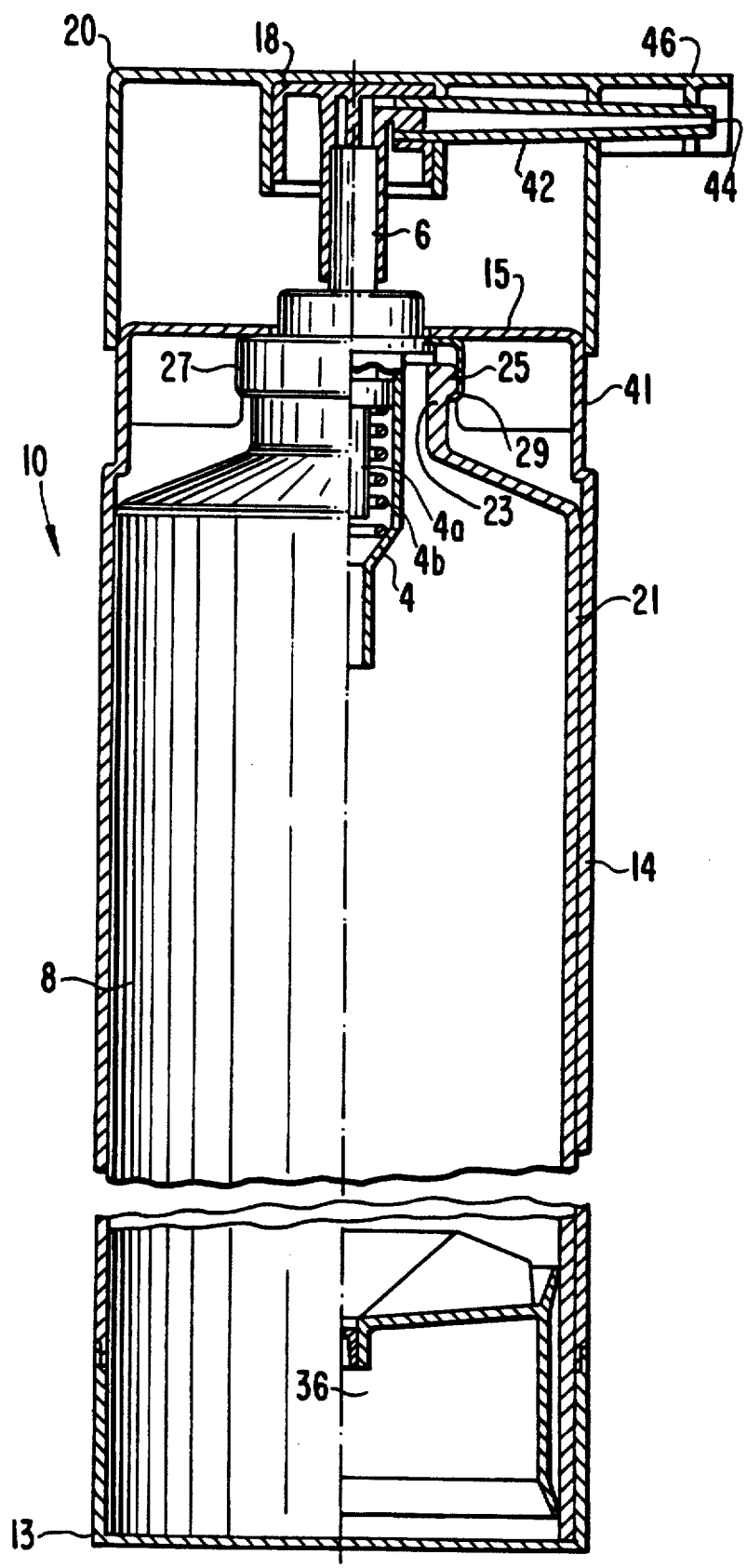
FIG. 2 illustrates the discharge apparatus of FIG. 1 in a part sectional side view.
Figure 3:
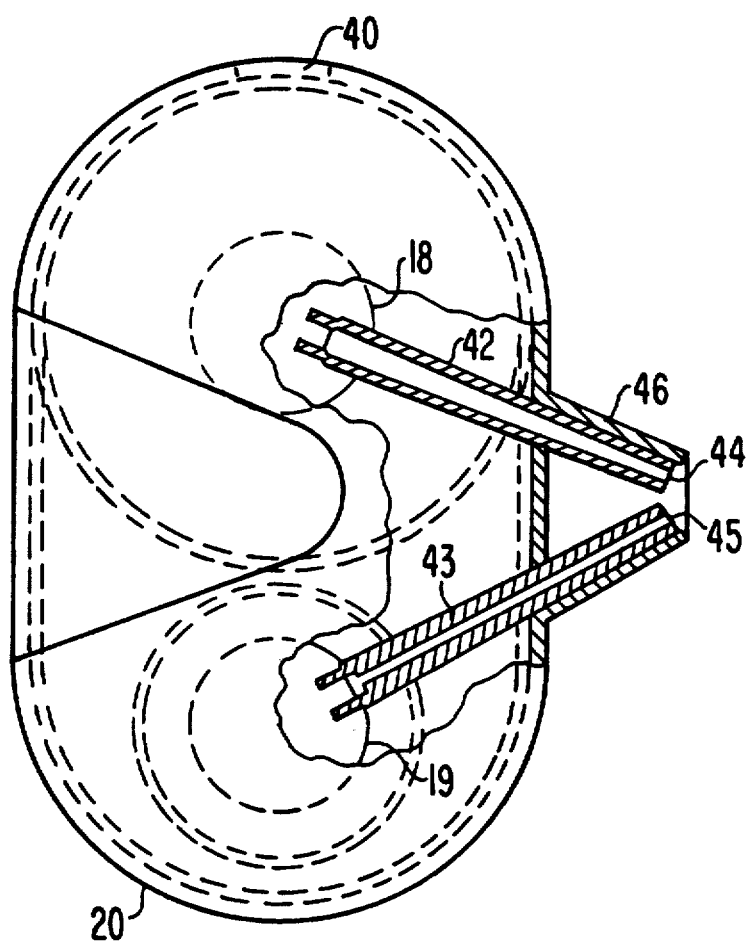
FIG. 3 shows the discharge apparatus of FIG. 2 in a part sectional plan view.

The discharge apparatus 1 according to FIGS. 1 to 3 has two discharge groups 2,3, which can also discharge separately. The discharge groups substantially comprise a discharge unit 4,5 with an actuator 6,7 and a medium reservoir 8,9. At least one discharge unit 4 or 5 is formed by a thrust piston pump 4a, whose casing is connected in a sealed and positionally fixed manner to the associated medium reservoir 8 or 9 and is located roughly in its center axis.

The two discharge groups 2,3 are arranged on a thin-walled body 10 in a directly adjacent, but substantially contact-free and parallel juxtaposed manner, said body forming in one piece an outer casing 11 and an inner casing 12. The outer casing 11 forming an outer face of the discharge apparatus 1 is closed at its bottom-side end by a cap-like closure 13, whose jacket has the same cross-sectional shape as the jacket 14 of the casing 11. Closure 13 is connected to said jacket 14 by ring webs engaging over the same. Facing the closure 13 of the jacket 14 has an end boundary in the form of an end wall 15 constructed in one piece therewith. The jacket 16 of the casing 12 is connected in one piece to the inside of said end wall 15 in such a way that it is spaced from the inside of the jacket 14 and only extends over a part to its inside length. The inner end of the jacket 16 is spaced from the bottom of the closure 13 and is tightly closed in one piece with a bottom 17.

On the thrust plunger or actuator 6,7 of the discharge unit 4,5 located outside the casing 11 is fixed, adjacent to the outside of the end wall 15, a separate discharge or actuating cap 18,19 formed by plugging on an inwardly located neck, which is surrounded by a much wider cap jacket. Thus, each discharge group 2 or 3 can be manually operated for discharge purposes if removed from the body 10. On the caps 18,19 a common actuating handle 20 mounted, which for each cap 18 or 19 has a socket projecting only over the inside of its end wall and whose cap jacket has substantially the same cross-sectional shape as the jacket 14 or the jacket of the closure 13. The inside diameter of the casing 11 is relatively closely adapted to the outside diameter of the cross-sectionally wider medium reservoir 8, so that the latter is supported and centered on a semicircular arc directly facing the inside of the jacket 14. Adjacent to the roughly equally wide, semicircular cross-sectional arc of the cross-sectionally flat oval jacket 14 the cross-sectionally narrower medium reservoir 9 is provided which, unlike the medium reservoir 8, is not located in the center axis of the associated cross-sectional ar.

At least one medium reservoir 8 or 9 is made from a transparent or translucent material and has a substantially cylindrical vessel body 21 or 22, which at its end passes via an offset ring shoulder into a narrowed vessel neck 23 or 24 and at the other end is open to the full inside diameter. On the end of the vessel neck 23 or 24, a slightly outwardly widened neck flange 25 or 26 is provided, on which the casing of the particular discharge unit 4 and 5 is fixed with a crimp ring 27,28, etc., in such a way that accompanied by the interposing of a seal it engages with a ring flange and under tension on the end face of the vessel neck 23 or 24. The discharge group 2, which is fixed with respect to the body 10, traverses part of the length of the casing of its discharge unit 4 through a closely adapted opening in the end wall 15 is positionally secured with respect to the body 10 by a snap connection 29 located on the inside of end wall 15. Prior to the fitting of the closure 13, discharge group 2 is inserted through the end of the body 10 until it strikes the ring flange or the crimp ring 27 of the discharge unit 4 on the inside of the end wall 15, accompanied by an engagement of the snap connection 29. Snap connection 29 be formed, for example, by ribs radially distributed over the circumference of the snap ring such that the offset snap shoulders engage behind the crimp ring 27 in the vicinity of the transition shoulder of the neck flange 25. The lower end of the medium reservoir 8 extends down to the inside of the bottom of the closure 13, so that the medium between bottom 13 and the end wall 15. Thus, the bottom of closure 13 forms a closure of the open end of the vessel body 21. The other discharge group 3 is displaceable with the respect to the body 10 by depression of the actuation handle 20. Displacement of discharge group 2 is effected over a first portion of the downward movement of actuating handle 20, starting from its initial position. For this purpose the jacket 16 of the casing 12 forms a linear sliding mounting support for the vessel body 22 of the medium reservoir 9. The discharge group 3 is connected to the actuating handle 20 in a substantially interlocking manner in both opposite movement directions by means of a driver 30. This driver 30 can comprise a singly or multiply longitudinally slotted sleeve, which in the longitudinal direction projects over the associated socket and is connected by means of a snap connection 31 to the medium reservoir 9. The end face of the sleeve engages on the ring shoulder 32 between the vessel body 22 and the vessel neck 24 and forms in cross-section spring arms 33 curved around the center axis of the driving connection. Each spring arm has a snap-action cam 31 projecting over the inside and which engages behind the neck flange 26 or the crimp ring 28 in the manner described relative to the snap connection 29. This discharge group 3 an be prefitted with the actuating handle 20 and then inserted from the side of the end wall 15 into the casing 12 open to its full inside diameter in the vicinity of the end wall 15 until the actuating handle 20 engages with the actuator or with the cap 18. The open end of the vessel body 22 is then located at a smaller distance from the bottom 17 compared with the overall stroke length of the actuating handle 20. Thus, the bottom 17 of inner casing 12 forms a stop 35 for the end of downward displacement of discharge group. In its starting position, the vessel neck 24 can project over the outside of the end wall 15. By withdrawing the actuating handle 20 from the casing 11 the medium reservoir 9 or the discharge group 3 can be removed and replaced by a new unit at any time.

In the vicinity of its end opposite to the discharge unit 4 or 5, the reservoir chamber of the medium reservoir 8 or 9 is bounded by a drag piston 36 or 37 which, under the vacuum occurring on sucking the medium, is moved automatically along the associated vessel body 21, 22, while maintaining a seal. At the base of each piston a filling opening for the reservoir chamber is provided which is closable by means of a cover. The suction opening 38 or 39 of the discharge unit 4 or 5 faces in a spaced manner the drag piston 36 or 37. The suction opening 38 or 39 is formed by the casing end of the associated discharge unit 4 or 5 and leads into a pump chamber, e.g., accompanied by the interposing of an intake valve.

For discharge purposes, the actuating handle 20 is pressed down by finger pressure on the outside of its end wall opposite the casing 11. The discharge unit 4 is then operated immediately over the entire actuating stroke until the medium located in the pump chamber is discharged. However, over a first partial stroke, the discharge group 3 is moved along synchronously with the actuating handle 20, so that initially the discharge unit 5 is not actuated. Only when the end of the medium reservoir 9 engages with the stop 35, is there an actuation of the discharge unit 5 over the remaining actuating stroke of the handle 20, namely a relative movement of the handle 20 or the actuator 7 with respect to the casing of the discharge unit 5. A corresponding moving pump piston is connected to the actuator 7. At the end of the actuating stroke the actuating handle 20 is released, so that the return springs 46 in the casings of the discharge units 4,5 return the latter to their starting position, whilst the return spring of the discharge unit 4 also resets the discharge group to its starting position with respect to the body 10.

As soon as the discharge group 3 has struck against the stop 35, the spring arms 33 undergo a shortening of their effective length accompanied by a bulging deformation. Although the snap-action cams 34 can rise or be disengaged from their snap position, on releasing the actuating handle 20 they immediately return to the secured position, so that on reaching the starting position of the discharge unit 5 they can serve as a return stroke driver for the discharge group 3. To this extent the spring arms 33 also form a return spring for the discharge units 4,5.

In the vicinity of at least one and in particular the medium reservoir 8, the jacket 14 of the casing 11 appropriately has an inspection window, e.g. in the form of a longitudinal slot and through which it is possible to see the filling state or the position of the drag piston 36 which serves as an indicator. Above the inspection window 40 the jacket 14 forms a slightly less wide portion 41, whose width is reduced by the wall thickness of the cap jacket of the actuating handle 20 and whose length is slightly greater than the length of the actuating stroke, so that in this position the handle 20 engages over position 41 and non dirt can enter the cavity within the handle 20.

Cap 18 or 19 forms a discharge head with a roughly radially freely outwardly projecting, tubular discharge connection 42 or 43, which is inserted in the cap 18 or 19. In plan view, the two discharge connections 42,43 are at an acute angle to one another and form with their free ends two directly adjacent discharge openings 44,45, which lead into the open and whose center axes intersect one another outside the discharge connections 42,43. The discharge connections 42,43 pass through the cap jacket of the actuating handle 20, which forms a cover 46 projecting over its outer circumference protecting the projecting ends of the connections 42,43. The cap 18 or 19 can also form a preassembled subassembly with the actuating handle 20. By replacing the cap, it is easy to change to differently dimensioned discharge connections.

What we claim is:

1. A discharge apparatus for media, which comprises: two functional units, each of the functional units comprising a medium reservoir, a discharge unit operatively connected to the medium reservoir, and a discharge actuator operatively connected to the discharge unit, the discharge apparatus further comprising means for simultaneously depressing the discharge actuators of the functional units, wherein at least one of the functional units is movable with its associated discharge actuator over part of the depression of the discharge actuators, so as to not discharge media from its medium reservoir during movement of the at least one functional unit.

2. A discharge apparatus according to claim 1, further comprising a stop which limits the path of movement of the at least one movably functional unit, so as to cause the at least one functional unit to discharge media from tis medium reservoir upon contact with the stop.

3. A discharge apparatus according to claim 1, wherein the two discharge units are housed within a body, and the at least one movably functional unit is displaceably mounted on a sliding guide formed by a casing within the body.

4. A discharge apparatus according to claim 1, further comprising a resilient actuating driver, and wherein the means for simultaneously depressing the discharge actuators of the functional units comprises a cap-like actuating handle, the actuating handle being connected to the at least one movable functional unit be means of the resilient actuating driver, and the resilient actuating driver comprising at least driving arm that engages an outer shoulder of the medium reservoir, the driving arm when compressed being deformable so as to shorten its effective length.

5. A discharge apparatus according to claim 1, further comprising a return spring for returning the at least one movable functional unit to its starting position and an actuating driver which also functional as a return driver.

6. A discharge apparatus according to claim 4, further comprising a snap connection, wherein the driver is connected by means of the snap connection to the at least one movable functional unit and resiliently engages with a neck flange of the medium reservoir associated with the at least one movable functional unit.

7. A discharge apparatus according to claim 1, wherein the discharge of at least one of the two jointly operable discharge units is staggered during simultaneous depression of the discharge actuators.

8. A discharge apparatus according to claim 1, further comprising a casing having a bottom, wherein the two functional units are disposed in the casing, and wherein at least one medium reservoir is downwardly movable during depression of the discharge actuators until its bottom end strikes against the casing bottom.

9. A discharge apparatus according to claim 1, wherein a common outer casing is providing for housing the two medium reservoirs, the common outer casing having a shorter inner casing for the insertable reception of at least one medium reservoir, the common outer casing being closed at an upper partly pen end with an actuating handle and at the other end with a lid-like closure.

10. A discharge apparatus according to claim 1, further comprising a base body including at least a outer casing into which the medium reservoirs are inserted, the outer casing having two end walls, wherein at least one medium reservoir is braced in a substantially clearance-free manner between the two end walls of the common outer casing and the at least one medium reservoir is secured with a snap connection to the base body.

11. A discharge apparatus according to claim 9, wherein the outer casing has a flat oval cross-sectional shape adapted to engage a larger of the two medium reservoirs and which is substantially the same shape as that of the actuating handle, which engages over a portion of the casing reduced by its wall thickness.

12. A discharge apparatus according to claim 1, wherein at least one discharge unit is connected by a thrust piston pump to a discharge head located on an actuating plunger and wherein the actuating handle is connected by means of a plug connection to the discharge head substantially located therein and is provided with a passage for at least one discharge channel of the discharge head terminating in a discharge opening.

13. A discharge apparatus according to claim 1, wherein at least one medium reservoir includes a reservoir jacket end, the discharge apparatus further comprising a drag piston and a casing separate from the medium reservoir and forming a reservoir chamber bounded by the drag piston, wherein the jacket end is closed with the casing.

14. A discharge apparatus for media, which comprises at least one medium reservoir, at least one functional unit, the at least one functional unit comprising a discharge means operatively connected to the medium reservoir, and a discharge actuator operatively connected to the discharge means, the discharge actuator being depressible over partial stroke units on an actuating stroke for determining discharge characteristics, including a maximum delivery speed and an effective delivery volume of the media per partial stroke unit, wherein the at least one functional unit is movable with its associated discharge actuator over part of the depression of the discharge actuator to provide during its movement at least one of the discharge characteristics in a value of at least zero and less than its maximum.

15. Discharge apparatus for discharging media, which comprises: at least one functional unit, the at least one functional unit comprising a medium reservoir, a discharge means operatively connected to the medium reservoir, and a depressible discharge actuator operatively connected to the discharge means, the discharge actuator being operable over a depression path, wherein at least the discharge actuator and at least part of the discharge means are movable over part of the depression of the discharge actuator, so as not to discharge media from its medium reservoir during movement of the at least one functional unit as a function of the depression path, and wherein the discharge apparatus further comprises at least one casing separate from the medium reservoir, the medium reservoir being at least partly enclosed in the at least one casing.

16. The discharge apparatus according to claim 15, wherein media is discharged from the discharged apparatus by means of a discharge stroke, and wherein the discharge apparatus further comprises
 (a) means for separating the discharge stroke from the actuating stroke of the discharge actuator during at least part of the actuating stroke, and
 (b) means for connecting the discharge stroke with the actuating stroke during the remainder of the actuating stroke media.

17. The discharge apparatus according to claim 15, wherein the discharge means of the at least one functional unit comprises a thrust plunger and a piston pump having a pump casing operable via the thrust plunger to perform a discharge stroke, and wherein the discharge apparatus further comprises an abutment positioned below the medium reservoir and means for commonly displacing the thrust plunger and the discharge actuator during part of the depression of the discharge actuator to define an idle path of the discharge means, the idle path being terminated by actuation of the discharge means via engagement of the discharge means with the abutment.

18. The discharge apparatus according to claim 15, wherein the discharge means includes discharge components operably displaceable with respect to each other over a discharge stroke during a discharge of the media, and wherein the discharge apparatus further comprises means for preventing relative motion of the discharge components during part of the depression of the discharge actuator.

19. The discharge apparatus according to claim 15, wherein the discharge means of the at least one functional unit is operably displaceable with respect to the medium reservoir during at least part of the depression of the discharge actuator, the discharge means including at least one discharge pump having a thrust plunger, the thrust plunger being fixed to the discharge actuator, and the discharge actuator comprising an actuating cap.

20. The discharge apparatus according to claim 19, further comprising a cap jacket, and wherein the actuating cap has an internal neck spaced apart from and surrounded by the cap jacket, the thrust plunger being fixed to the internal neck.

21. The discharge apparatus according to claim 15, wherein the at least one casing has at least one casing jacket and an end wall defining an end boundary of the at least one casing jacket, one casing defining an external casing, the end wall being unitary with the at least one casing jacket.

22. The discharge apparatus according to claim 15, wherein the at least one casing defines a linear sliding mounting support for the medium reservoir.

23. The discharge apparatus according to claim 15, further comprising a crimp ring having an annular cross-section and a flange, and wherein at least one of the crimp ring and the flange forms a holding element for securing the position of the medium reservoir with respect to the at least one casing.

24. The discharge apparatus according to claim 15, further comprising a snap connection securing the position of the medium reservoir with respect to the at least one casing.

25. The discharge apparatus according to claim 24, wherein the snap connection has circumferentially distributed snap members, and wherein the at least one casing has opposed end faces, the medium reservoir being braced substantially free of motion to the at least one casing and being positionally secured between the end faces of the at least one casing.

26. The discharge apparatus according to claim 15, further comprising a snap connection securing the position of the medium reservoir with respect to the discharge actuator, the snap function disengaging as a function of the depression of the discharge actuator.

27. The discharge apparatus according to claim 15, wherein the casing includes an internal casing jacket and an external casing jacket spaced apart from and surrounding the internal casing jacket, the internal casing jacket having an internal jacket end and the external casing jacket having an associated casing end spaced from the internal jacket end, the internal casing jacket extending along only part of the length of the external casing jacket, the internal casing jacket operably slidingly receiving the medium reservoir and having a closure at the internal jacket end, the casing end of the external casing jacket being provided for inserting the medium reservoir into the casing.

28. The discharge apparatus according to claim 15, wherein the at least one casing slidingly receives the medium reservoir, and wherein the casing has a bottom end and the medium reservoir has a reservoir end associated with and spaced from the casing bottom end, the casing bottom end defining a sliding stop for the reservoir end.

29. The discharge apparatus according to claim 15, wherein at one end, the medium reservoir has a neck flange, and wherein the discharge apparatus further comprises at least one deformable, resilient element engaging the medium reservoir behind the neck flange, the at least one element deforming as a function of the depression of the discharge actuator.

30. The discharge apparatus according to claim 15, further comprising at least one tubular discharge connection having an outer end, a discharge outlet for the media on the outer end, and a protection cover over at least the discharge outlet for protecting the tubular discharge connection.

31. The discharge apparatus according to claim 15, the at least one casing has a casing jacket and a window opening in the casing jacket, the window opening providing an indication of the amount of media in the discharge apparatus.

32. The discharge apparatus according to claim 15, comprising a single functional unit.

33. The discharge apparatus according to claim 15, wherein the discharge means substantially completely empties the medium reservoir by only one single actuation free of an operable return stroke.

* * * * *

UNITED STATES PATENT AND TRADEMARK OFFICE
CERTIFICATE OF CORRECTION

PATENT NO. : 5,301,841
DATED : April 12, 1994
INVENTOR(S) : Karl-Heinz Fuchs

It is certified that error appears in the above-indentified patent and that said Letters Patent is hereby corrected as shown below:

Col. 6, line 43, "movably" should read —movable—.

Col. 6, line 56, "be" should read —by—.

Col. 6, line 65, "functional" should read —functions—.

Col. 7, line 16, "providing" should read —provided—.

Col. 7, line 21, "pen" should read —open—.

Signed and Sealed this

Twentieth Day of September, 1994

Attest:

BRUCE LEHMAN

Attesting Officer     Commissioner of Patents and Trademarks